United States Patent
Cheng et al.

(10) Patent No.: US 9,919,973 B1
(45) Date of Patent: Mar. 20, 2018

(54) SYNTHESIS OF HIGH TEMPERATURE CERAMIC POWDERS

(71) Applicants: Zhe Cheng, Pembroke Pines, FL (US); Paniz Foroughi, Miami, FL (US); Andres Behrens, Miami, FL (US)

(72) Inventors: Zhe Cheng, Pembroke Pines, FL (US); Paniz Foroughi, Miami, FL (US); Andres Behrens, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 15/475,674

(22) Filed: Mar. 31, 2017

(51) Int. Cl.
*B01J 2/04* (2006.01)
*C04B 35/626* (2006.01)
*C04B 35/56* (2006.01)

(52) U.S. Cl.
CPC ............ *C04B 35/626* (2013.01); *B01J 2/04* (2013.01); *C04B 35/5607* (2013.01); *C04B 2235/95* (2013.01)

(58) Field of Classification Search
CPC .................................................. B01J 2/04
See application file for complete search history.

(56) References Cited

U.S. PATENT DOCUMENTS

| | | | | |
|---|---|---|---|---|
| 5,190,737 A * | 3/1993 | Weimer | ............... | B01J 8/0095 423/345 |
| 6,824,753 B2 * | 11/2004 | Paine | ............... | B82Y 30/00 423/277 |
| 7,060,237 B1 * | 6/2006 | Paine, Jr. | ............... | C01B 21/064 423/277 |
| 2002/0155052 A1 * | 10/2002 | Paine | ............... | B01D 53/8662 423/245.3 |
| 2004/0013943 A1 * | 1/2004 | Stoker | ............... | H01M 4/0419 429/231.95 |
| 2005/0173094 A1 * | 8/2005 | Mori | ............... | B01J 20/0248 164/519 |
| 2005/0281726 A1 * | 12/2005 | Paine, Jr. | ............... | C01B 21/064 423/277 |
| 2010/0202956 A1 * | 8/2010 | Bogicevic | ............... | C09C 1/3661 423/439 |

(Continued)

OTHER PUBLICATIONS

Čerović, L.S. et al., "Synthesis of Spherical β-Silicon Carbide Particles by Ultrasonic Spray Pyrolysis." *J. Am. Ceram. Soc.*, Sep. 2005, 79(8):2215-2217, doi: 10.1111/j.1151-2916.1996.tb08964.x.

(Continued)

*Primary Examiner* — Erin Snelting
(74) *Attorney, Agent, or Firm* — Saliwanchik, Lloyd & Eisenschenk

(57) ABSTRACT

The present invention relates to methods and apparatuses for forming high temperature ceramic powders. A method of producing high temperature ceramic powders according to an embodiment of the present invention can include preparing a solution, atomizing the solution, providing a gas and carrying the atomized solution into a furnace via the gas, evaporating the solvent, precipitating and drying the solutes, performing a thermolysis (or pyrolysis) reaction, and performing a carbothermal reduction reaction (CTR) in situ, and collecting product particles after they exit from the furnace.

20 Claims, 2 Drawing Sheets

(56) References Cited

U.S. PATENT DOCUMENTS

2013/0058724 A1* 3/2013 John .................. B09C 1/002
    405/128.5

OTHER PUBLICATIONS

Cheng, Z., "Reaction Kinetics and Structural Evolution for the Formation of Nanocrystalline Silicon Carbide via Carbothermal Reduction." *Georgia Tech Theses and Dissertations*, Nov. 2004, pp. 1-972.

Cheng, Z. et at, "Synthesis of Nanocrystalline TaC Powders via Single-Step High Temperature Spray Pyrolysis from Solution Precursors." *Ceramics International*, Nov. 2016, 43:3431-3434, doi: 10.1016/j.ceramint.2016.11.177.

Gusev, A.I. et al., "Atomic and Vacancy Ordering in Carbide $\zeta$-$Ta_4C_{3-x}$ ($0.28 \leq x \leq 0.40$) and Phase Equilibria in the Ta—C System." *Journal of Solid State Chemistry*, 180:3234-3246, doi: 10.1016/j.jssc.2007.09.015.

Ishigaki, T. et at, "Controlling the Synthesis of TaC Nanopowders by Injecting Liquid Precursor into RF Induction Plasma." *Science and Technology of Advanced Materials*, Jan. 2005, 6:111-118, doi: 10.1016/j.stam.2004.11.001.

Jung, D.S. et al., "Design of Particles by Spray Pyrolysis and Recent Progress in its Application." *Korean J. Chem. Eng.*, Aug. 2010, 27(6):1621-1645, doi: 10.1007/s11814-010-0402-5.

Ko, J.-W. et al., "Synthesis and Characterization of Spherical Magnesium Di-Boride Nano-Powders Obtained by Spray Pyrolysis." *Physica C*, May 2004, 412-414:1194-1197, doi: 10.1016/j.physc.2004.01.139.

Kwon, D.-H. et at, "Fabrication of Ultrafine TaC Powders by Mechano-Chemical Process." *Materials Letters*, Sep. 2004, 58:3863-3867, doi: 10.1016/j.matlet.2004.07.038.

Lindquist, D.A. et al., "Boron Nitrade Powders Formed by Aerosol Decomposition of Poly(borazinylamine) Solutions." *Journal of the American Ceramic Society*, Dec. 1991, 74(12):Abstract, doi: 10.1111/j.1151-2916.1991.tb04310.x.

Liu, T.-Q. et al., "Preparation of Spherical $Si_3N_4$ Particles from Polysilazane by Ultrasonic Spray Pyrolysis Technique." *Nippon Seramikkusu Kyokai Gakujutsu Rombunshi*, Jan. 1989, 97(10):1321-1325, doi: 10.2109/jcersj.97.1321.

Messing, G.L. et al., "Ceramic Powder Synthesis by Spray Pyrolysis." *Journal of the American Ceramic Society*, Nov. 1993, 76(11):Abstract, doi: 10.1111/j.1151-2916.1993.tb04007.x.

Opeka, M.M. et al., "Oxidation-Based Materials Selection for 2000° C. + Hypersonic Aerosurfaces: Theoretical Considerations and Historical Experience." *Journal of Materials Science*, Oct. 2004, 39(19):5887-5904.

Sack, M.D. et al., "Carbothermal Reduction Synthesis of Nanocrystalline Zirconium Carbide and Hafnium Carbide Powders Using Solution-Derived Precursors." *Journal of Materials Science*, Feb. 2004, 39:6057-6066, doi: 10.1023/B:JMSC.0000041702.76858.a7.

Salles, V., Bernard, S., "A Review on the Preparation of Borazine-Derived Boron Nitride Nanoparticles and Nanopolyhedrons by Spray-Pyrolysis and Annealing Process." *Nanomaterials and Nanotechnology*, Dec. 2015, 6(1):1-13, doi: 10.5772/62161.

Teoh, W.Y. et al., "Flame Spray Pyrolysis: An Enabling Technology for Nanoparticles Design and Fabrication." *Nanoscale*, Mar. 2010, 2:1324-1347, doi: 10.1039/c0nr00017e.

Tian, Y. et al, "Ultrahand Nanotwinned Cubic Boron Nitride." *Nature*, Jan. 2013, 493:385-388, doi: 10.1038/nature11728.

Wollmershauser, J.A. et al., "An Extended Hardness Limit in Bulk Nanoceramics." *Acta Materialia*, Feb. 2014, 69:9-16, doi: 10.1016/j.actamat.2014.01.030.

Wood, G.L. et al., "Aerosol Synthesis of Spherical Morphology Boron Nitride Powders from Organoborate Precursors." *Chem. Mater.*, Feb. 2006, 18:1434-1442, doi: 10.1021/cm052032x.

Wuchina, E. et al., "UHTCs: Ultra-High Temperature Ceramic Materials for Extreme Environment Applications." *The Electrochemical Society Interface*, 2014, pp. 30-36.

* cited by examiner

SYNTHESIS OF HIGH TEMPERATURE CERAMIC POWDERS

BACKGROUND OF INVENTION

High temperature ceramics (HTC) and ultrahigh temperature ceramics (UHTC) are ceramic materials that typically have melting points above 2500-3000° C. HTC and UHTC, in the form of powders, monolithic ceramics, or composites, find many important applications from grinding and cutting materials in machinery and mining industries to thermal insulation tiles, missile nozzles, and hypersonic vehicle leading edges in the aerospace industry. Reducing the size of HTC and UHTC powders from microns to submicrons and even into the nanometer range (i.e., <~100 nm) offers additional benefits, such as simplified post-synthesis powder processing. Benefits of simplified post-synthesis powder processing include reducing the need for extensive grinding, lowering the sintering temperature and associated energy consumption for materials processing and densification, and greater ease in manufacturing products with sub-micron or even nano-sized grains. These advantages often lead to improved mechanical properties such as strength, hardness, and toughness of the ceramic materials. In addition, nano-powders offer flexibility in subsequent processing techniques to make either bulk ceramics via powder consolidation or coatings via techniques such as plasma spray.

Although synthesis of nano-sized HTC and UHTC powders has been studied for some time, most methods suffer from drawbacks in terms of cost, product quality, and process safety. For example, nano-TaC has been synthesized using an RF plasma method in a quick one step process, but the method uses costly organometallic precursors and hydrogen gas and several steps in the operation have to be carried out in a glove-box. Similarly, combustion synthesis or self-propagating high-temperature synthesis (SHS) methods are fast, but suffer from limitations related to the nature of batch processing and difficulty in process control due to too short reaction times for SHS. In addition, mechanical milling is often involved for SHS, which also raises contamination concerns. Therefore, there is a continued need for new methods and apparatuses for producing high temperature ceramics.

BRIEF SUMMARY

Embodiments of the present invention include methods and apparatuses for forming high temperature ceramic powders.

A method of producing high temperature ceramic powders according to an embodiment of the present invention can include preparing a solution including a solvent and solutes, atomizing the solution, providing a gas and carrying the atomized solution into a furnace via the gas, evaporating the solvent, precipitating and drying the solutes, performing a thermolysis (or pyrolysis) reaction, and performing a carbothermal reduction reaction (CTR) in situ, and collecting product particles after they exit from the furnace.

Evaporating the solvent, precipitating and drying solutes, performing the thermolysis (or pyrolysis) reaction, and performing the carbothermal reduction reaction (CTR) can happen in a single pass within the furnace. The furnace can be a pipe or tube furnace and can operate at temperatures ranging from 1400° C. to 2400° C. Instead of being a single stage furnace, a two-stage or three-stage furnace can be substituted.

The product particles can include one or more high temperature ceramics, non-oxide ceramics, and high temperature non-oxide ceramics. The solution that is atomized can include one or more of metal compounds, metalloid compounds, transition metals, transition metal salts, actinoids, metalloids, carbon sources, carbon precursors, and nitrogen containing compounds. The carbon source or carbon precursor can include phenolic resins, vinylidene chloride polymers, carbon black, acetylene carbon black, other hydrocarbons, carbohydrates, and other carbon containing organic compounds. The solvent can include alcohols such as ethanol and 1-pentanol, or other hydrocarbon solvents. The gas is preferably an inert gas, such as argon and nitrogen or a low level vacuum, and can be fed directly to the atomizer, keeping ambient air out of the furnace.

DETAILED DISCLOSURE

Embodiments of the present invention include methods and apparatuses for forming ceramic powders, and especially high temperature ceramic powders.

Figure 1:
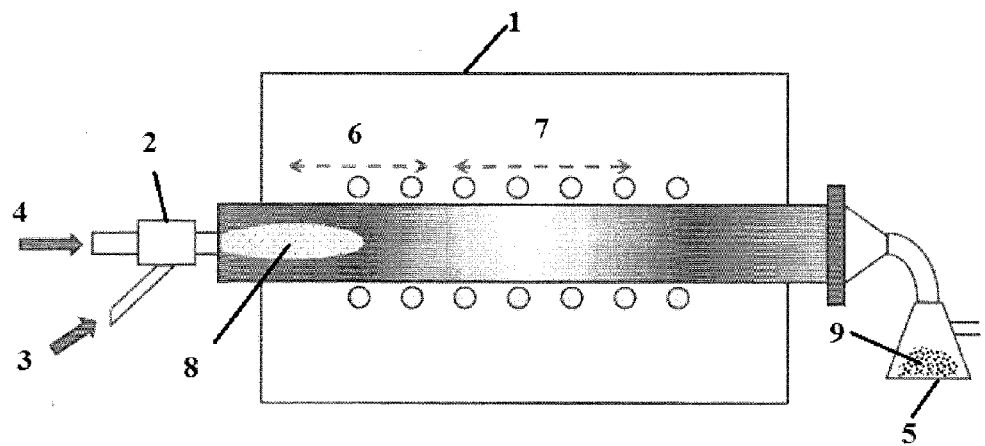
FIG. 1 shows a diagram of an apparatus according to an embodiment of the present invention.

Methods of the present invention can be executed using an apparatus such as that shown in the diagram of FIG. 1. A method of producing high temperature ceramic powders according to the present invention can include preparing a solution including a solvent and solutes, atomizing the solution 3, providing a gas 4 and carrying the atomized solution 8 into a furnace 1 via the gas 4, evaporating the solvent, precipitating and drying the solutes, performing a thermolysis or pyrolysis reaction 6, and performing a carbothermal reduction reaction (CTR) 7 in situ to form product particles 9. After the product particles 9 have been formed and exit the furnace 4, they can be captured in a powder collector 5. An atomizer or nebulizer 2 can be used to atomize the solution and the solution droplets are preferably microns in size.

Advantageously, the evaporating of the solvent, the precipitating and drying of the solutes, the thermolysis or pyrolysis reaction, and the performing of the carbothermal reduction (CTR) reaction can occur within a single pass of the furnace 1. The furnace can be a one stage furnace, a two-stage furnace (having two distinct temperature zones), a three-stage furnace (having three distinct temperature zones), or an industrial multi-zone furnace or kiln. The furnace of FIG. 1 is shown with a first stage 6, having a temperature of about 800° C., and a second stage 7 having a temperature of about 1650° C. The furnace can be a tube furnace 1 or multiple tubes can be used in parallel (or a large heating chamber) to scale up production while maintaining a high rate of heat transfer with the incoming gas.

Depending on the raw materials included in the solution and the desired product profile, the furnace stages can operate at different temperatures. Each of the stages of the furnace can operate at a temperature of, for example, any of the following values, about any of the following values, at least any of the following values, not more than any of the following values, or within any range having any of the following values as endpoints (all ranges and endpoints can be inclusive), though embodiments are not limited thereto): 1200° C., 1300° C., 1400° C., 1500° C., 1550° C., 1600° C., 1650° C., 1700° C., 1750° C., 1800° C., 1850° C., 1900° C., 1950° C., 2000° C., 2100° C., 2200° C., 2300° C., 2400° C. and 2500° C. For example, a single stage furnace (or a stage of a multistage furnace) of the present invention can operate at a temperature of about 1650° C., at least 1650° C., less than 1800° C., or in a range from 1550° C. to 1750° C. Furthermore, it should be clear that each stage of a multistage furnace can operate at different temperatures, temperature ranges, and overlapping temperature ranges.

The average furnace retention time (defined as the "furnace volume/gas volumetric flow rate") can also range depending on the raw materials included in the solution and the desired product profile. The average furnace retention time can be, for example, any of the following values, about any of the following values, at least any of the following values, not more than any of the following values, or within any range having any of the following values as endpoints (all ranges and endpoints can be inclusive), though embodiments are not limited thereto: 5 seconds, 10 seconds, 15 seconds, 20 seconds, 25 second, 30 seconds, 40 seconds, 50 seconds, 1.0 minutes, 1.5 minutes, 2.0 minutes, 2.5 minutes, 3 minutes, 4 minutes, 5 minutes, 6 minutes, 7 minutes, 8 minutes, 9 minutes, 10 minutes, 12 minutes, 14 minutes, 16 minutes, 18 minutes, 20 minutes, 25 minutes, and 30 minutes. For example, the average furnace retention time can be about 50 seconds, at least 1.5 minutes, less than 5 minutes, or in a range from 1.5 minutes to 3 minutes (inclusive).

In order to reduce energy consumption and gain furnace performance, gas exiting the furnace can pass through a heat exchanger (not shown) and transfer heat to the gas entering the furnace. The gases entering the heat exchanger and leaving the heat exchanger should be isolated from each other. However, in an alternative embodiment, a portion of the gas and product mixture leaving the furnace can be recycled and incorporated with fresh gas and atomized solution entering the heat exchanger. The gas going into the furnace can be heated by the heat exchanger either before or after the solution is atomized in the incoming gas.

The gas that is used to carry the atomized solution through the furnace is preferably an inert gas, such as nitrogen and argon, or a mixture of inert gasses. However, ambient air or processed ambient air may be appropriate in some circumstances. A low grade vacuum can be incorporated. An inert gas can be fed directly to the atomizer to keep oxygen, moisture and other contaminants out of the furnace.

The solution can be formed of one or more solvents, including but not limited to alcohols such as ethanol and pentanol, and other hydrocarbon solvents. After the solutes are added to the solution, a precipitating agent can be added to the solution to remove unwanted substances prior to the solution being atomized. For example, ammonia can be added to precipitate chloride ions, which then can be removed, e.g., through filtration. The solution that is atomized and then passes through the furnace can include metal compounds, transition metals (in salt or other form), actinoids (e.g., Thorium), metalloids (e.g., tetraethyorthosilicate (TEOS) as silicon compound, boric acid or triethyl borate (TEB) as boron compound, silicon, such as silicon monoxide or dioxide, boron, etc.), one or more carbon sources and/or carbon precursors, and one or more nitrogen sources and/or nitrogen precursors. The transition metals or transition metal salts can include one or more of Tantalum, Hafnium, Zirconium, Titanium, Niobium, Vanadium, Magnesium, Aluminum, Chromium, Molybenum, Tungsten, Scandium, Yttrium, Lanthanum, and other Lanthanide metals, Manganese, Iron, Cobalt, and Nickel. The carbon sources and carbon precursors can be, for example, one or a mixture of phenolic resins, vinylidene chloride polymers, carbon black, acetylene carbon black, other hydrocarbons and carbon containing organic compounds, and carbohydrates. The nitrogen source can include urea, glycine, and other nitrogen containing compounds.

The product particles can include high temperature ceramics, non-oxide ceramics, and high temperature non-oxide ceramics. After the product particles are collected in a powder collector, the particles can be rinsed, or mixed and filtered, or otherwise separated. The product particles can be rinsed using solvents (e.g., deionized water) to remove unwanted compositions and impurities such as NaCl. The product particles can also be sorted or separated using one or more mechanical processes such as filters, screens, vibration, and centrifugal air separators. The mechanical separation can occur with or without rinsing the product particles, and if the particles are rinsed they may need to be dried before mechanical separation. After mechanical separation, the high temperature ceramics can be removed and remaining raw materials can be recycled.

The one or more metal compounds (in salt or other form), metalloid compounds (e.g., tetraethyorthosilicate (TEOS) as silicon compound, boric acid or triethyl borate (TEB) as a boron compounds), transition metals, transition metal salts, actinoids, metalloids, one or more carbon sources and/or carbon precursors, and one or more nitrogen sources and/or nitrogen precursors can be supplied in excess to drive the reaction. For example, the molar carbon ratio (the mols of carbon relative to the mols of metals, actinoids, and/or metalloids) can be, for example, any of the following values, about any of the following values, at least any of the following values, not more than any of the following values, or within any range having any of the following values as endpoints (all ranges and endpoints can be inclusive), though embodiments are not limited thereto: 1.0, 2.0, 3.0, 4.0, 5.0, 6.0, 7.0, 8.0, 9.0 10.0, 12.0, 14.0, 16.0, 18.0, 20.0, 22.0 24.0, 26.0, 28.0, and 30.0. For example, the molar carbon ratio can be about 10.0, at least 8.0, less than 8.0, or in a range from 8.0 to 12.0 (inclusive).

The ceramic particles leaving the furnace can have sizes of, for example, any of the following values, about any of the following values, at least any of the following values, not more than any of the following values, or within any range having any of the following values as endpoints (all ranges and endpoints can be inclusive), though embodiments are not limited thereto (all measurements are in nanometers): 5, 10, 20, 30, 40, 50, 60, 80, 100, 120, 140 160 180, 200, 250, 300, 1000, and 5000. For example, the average ceramic particle size can be 40 nanometers, at least 30 nanometers, less than 100 nanometers, or in a range from 20 nanometers to 50 nanometers (inclusive). After leaving the furnace, the product particles can be milled (e.g., with mechanical ball milling or focused ion beam (FIB) milling) to further adjust their size. The milling can occur before, after, or without mechanical separation, filtering, or rinsing.

The examples described below illustrate exemplary embodiments of the materials and methods of the subject invention, as well as analysis of the techniques and products of the present invention. These exemplary embodiments should not be construed as limiting the scope of the subject invention.

EXAMPLE 1

FIG. 1 shows a schematic diagram of an apparatus that was used while conducting these experiments. Soluble precursors were fed and broken into fine, micron-sized droplets via an atomizer or a nebulizer. The fine droplets were then carried into the hot zone of a tube furnace by an inert carrier gas. Different from the conventional spray pyrolysis that typically operates at temperatures less than approximately 1000° C., the methods of the present invention include the use of higher temperatures. The "pyrolysis" step included drying and thermolysis, which is the removal of low molecular weight species to form oxides and carbon. The reaction was then extended to incorporate a rapid (i.e., within a few minutes or even seconds) in situ carbothermal reduction (CTR) reaction at higher temperatures (e.g., >~1600° C.) to achieve synthesis of nanopowders of HTC and UHTC (e.g., carbides) in a fast and simple process, all in a single pass through one furnace.

In this experiment, the synthesis of nanocrystalline TaC UHTC powders started with the tantalum source tantalum pentachloride ($TaCl_5$, 99.8%, Alfa Aesar #14164), the carbon precursor Novolac phenolic resin (Plenco, 14353, R5420), and solvents including absolute ethanol (99.5+%, Acros Organics #61509-0020) or 1-pentanol (99+%, Alfa Aesar #30898). Two recipes were adopted, as summarized in Table 1. For recipe R1, phenolic resin was first dissolved in ethanol to form an orange-colored solution. $TaCl_5$ was dissolved separately in 1-pentanol, into which the phenolic resin-ethanol solution was then added. For recipe R2, ethanol was used as the solvent for both phenolic resin and $TaCl_5$. The precursor solutions were either used directly as was the case with R1, or mixed with a small amount of ammonia aqueous solution (2M solution in ethanol, Sigma-Aldrich #392685) to remove Cl ion as precipitated $NH_4Cl$ crystals from the precursor solution and then nebulized, as was done for R2. To break the solution into fine droplets, a commercial medical nebulizer was used, and Argon (UHP grade, Airgas) was used as the carrier gas at a flow rate of ~1 L/min. The UHP Argon gas was fed directly to the inlet of the medical nebulizer so that the nebulizer did not suck air into the system, which would cause oxidation of the products in the HTSP. The fine droplets from the nebulizer were brought into a high temperature tube furnace (MHI industry, model H18-40HT) fitted with a sealed alumina tube with an outside diameter of 50 mm and inner diameter of 44 mm. During the process, the temperature in the constant temperature zone (~30 cm long and also the highest temperature region) of the furnace was approximately 1650° C., and the temperature decreased going away from the constant temperature zone. As explained, droplets of the precursor solutions go through complex processes of solvent evaporation, thermolysis, and finally CTR as described in the following equation, $$Ta_2O_5 + 7C = 2TaC + 5CO\uparrow \qquad (1)$$

to produce TaC. The powder product was collected in a plastic bottle and analyzed by XRD and SEM for characterization of phase and microstructure.

EXAMPLE 2

Figure 2:
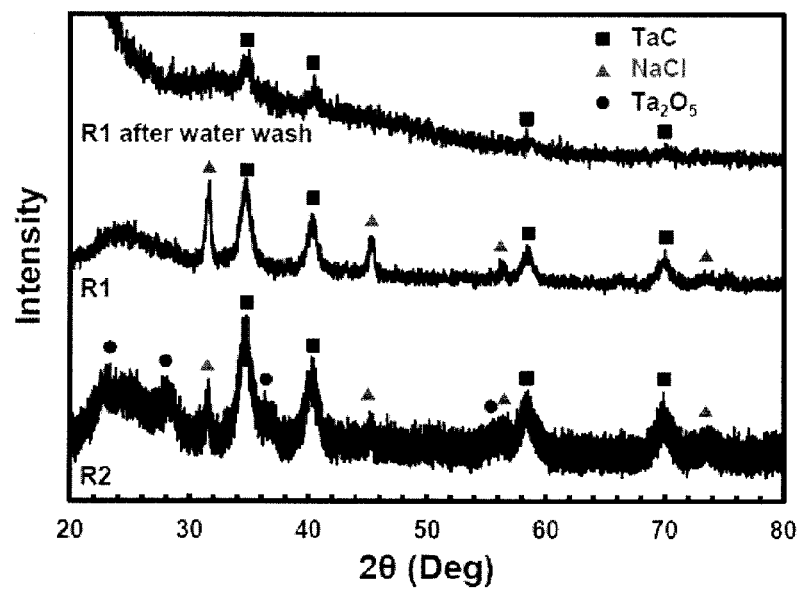
FIG. 2 shows a graph illustrating XRD patterns for nanocrystalline TaC fabricated according to an embodiment of the present invention.
Figures 3A, 3B, 3C:
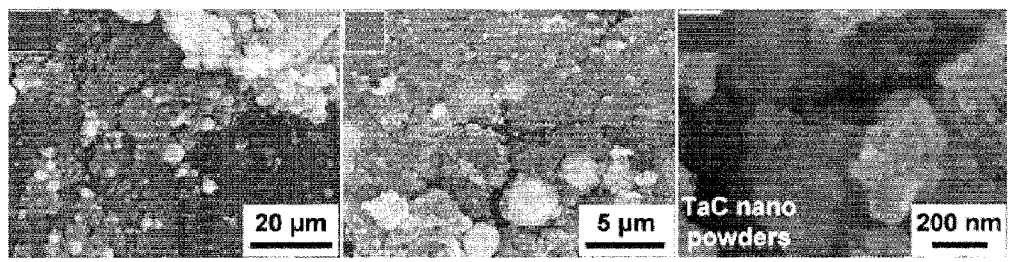
FIGS. 3A-3F show SEM images of nanoscrystalline TaC powders fabricated according to an embodiment of the present invention.
Figures 3D, 3E, 3F:
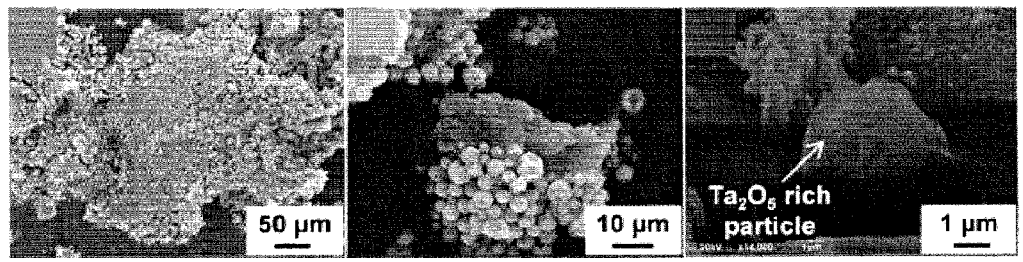

After the proof of concept experiments were conducted, the resulting products were analyzed to better understand the effectiveness of the present invention. FIG. 2 shows the XRD patterns of the synthesized TaC powders. For both recipe R1 and R2, clear peaks corresponding to TaC (JCPSD card #98-008-3479) were identified apart from peaks corresponding to NaCl (JCPDS card #00-005-0628), which is a contaminant in the processing. The identification of TaC demonstrates the concept that TaC UHTC powder can be synthesized from typical oxygen-containing precursors and solvents since both phenolic resin, as the carbon source, and ethanol, as the solvent, contain oxygen. The origin for Na (as in NaCl) was not exactly clear, but was most likely due to impurities in either the phenolic resin or $TaCl_5$ source material. By comparing the XRD pattern for products from recipe R1 with R2, it is seen that insufficient carbon was used for recipe R2, as evidenced by the diffraction peaks corresponding to crystalline $Ta_2O_5$ (JCPDS card #00-019-1299). It was noticed that, despite the treatment with an aqueous ammonia solution (as described for recipe R2) to try to remove Cl compounds via precipitation of $NH_4Cl$ in the ethanol solution, a small amount of NaCl was still identified in the product. Because of the remaining NaCl, the product particles were washed in DI water. Upon drying, XRD for the products was obtained, and the result for the TaC powder from R1 is also shown in FIG. 2.

For both powders, from R1 and R2, the wide width of the diffraction peaks for the synthesized TaC suggest the grain size to be <~100 nm. It is noted that grain size analysis using Scherrer equation may underestimate the grain size by about 10 nm, which may be due to line broadening associated with possible deviation from the 1:1 stoichiometry for the Ta—C system.

FIGS. 3A-3F show SEM images for the obtained TaC powders. Two types of morphologies can be observed: one corresponds to fine porous powders with a grain size in the range of ~20-50 nm that are agglomerated together, as in FIGS. 3B, 3C, and 3E; while the other corresponds to micron-sized spherical powders as expected from the conventional spray pyrolysis process, as in FIGS. 3A, 3B, 3D, 3E, and 3F. Elemental analysis via EDS suggests the nanoparticles contain Ta and C and almost no O, which indicates the nanocrystalline particles are TaC. On the other hand, the micron-sized spherical particles are fairly dense, as seen from one cross-section prepared by focus ion beam (FIB) milling, as in FIG. 3F. Such relatively dense, micron-sized particles are attributed to unreacted $Ta_2O_5$-rich regions, which is rational due to the relative low melting point of $Ta_2O_5$ ($T_m$=1872° C.) compared to TaC ($T_m$=3880° C.). It is also consistent with the recipes used: the C:$Ta_2O_5$ molar ratio was 10:1 for R1 and 9:1 for R2: the low-mag SEM images (see FIGS. 3D-3E) clearly show much more micron-

TABLE 1

Summary of recipes for different mixed solutions used for the synthesis of nanocrystalline TaC powders.

| Recipe | Tantalum chloride (g) | Phenolic resin (g) | Ethanol (g) | 1-Pentanol (g) | 2M ammonia solution (g) | C:$Ta_2O_5$ molar ratio* |
|---|---|---|---|---|---|---|
| R1 | 0.330 | 0.138 | 11.835 | 2.840 | — | 10:1 |
| R2 | 0.796 | 0.300 | 11.828 | — | 0.856 | 9:1 |

*Assuming phenolic resin gives carbon yield of 40 wt.% after thermolysis.

sized, dense spherical particles for the powder from R2, which correlates well with the clear presence of diffraction peaks of $Ta_2O_5$ in the XRD pattern for the product from R2.

Finally, considering that the flow rate of Argon was 1 L/min and the alumina tube inner diameter was 44 mm, the linear velocity of the droplets was approximately 1 cm/sec. Given the center uniform temperature zone of the furnace is at about 30 cm, the total CTR reaction time was estimated to be approximately 30 seconds and the total processing time for one pass from solution to TaC powder was approximately 2 minutes, which compares favorably with existing methods of synthesis of nanocrystalline UHTC powders using soluble precursors, which in most cases takes hours or even days.

The subject invention includes, but is not limited to, the following exemplified embodiments.

EMBODIMENT 1

A method of producing high temperature ceramic powders comprising:
 preparing a solution including a solvent and solutes;
 atomizing the solution (to form micron sized droplets);
 providing a gas (or vacuum) and carrying the atomized solution into a furnace via the gas (or vacuum);
 evaporating the solvent, precipitating and drying the solutes, performing a thermolysis (or pyrolysis) reaction, and performing a carbothermal reduction reaction (CTR) in situ; and
 collecting product particles after they exit from the furnace.

EMBODIMENT 2

The method of producing high temperature ceramic powders of embodiment 1, characterized in that the atomizing is performed by an atomizer or nebulizer.

EMBODIMENT 3

The method of producing high temperature ceramic powders of any of embodiments 1 to 2, characterized in that the evaporating the solvent, the precipitating and drying solutes, the performing the thermolysis (or pyrolysis) reaction, and the performing the carbothermal reduction reaction (CTR) happens within a single pass within the furnace (e.g., a temperature range of 1400° C. to 2400° C.).

EMBODIMENT 4

The method of producing high temperature ceramic powders of any of embodiments 1 to 3, characterized in that the furnace is a two-stage furnace (e.g., with two areas having different temperatures) or a three-stage furnace (with three areas having different temperature ranges), or other industrial furnaces or kilns.

EMBODIMENT 5

The method of producing high temperature ceramic powders of any of embodiments 1 to 4, characterized in that the product particles include one or more of high temperature ceramics, non-oxide ceramics, and high temperature non-oxide ceramics.

EMBODIMENT 6

The method of producing high temperature ceramic powders of any of embodiments 1 to 5, characterized in that the solution includes one or more of a transition metal(s), metalloid compounds (e.g., tetraethyorthosilicate (TEOS) as silicon compound, boric acid or triethyl borate (TEB) as boron compounds, etc.), a transition metal salt(s), an actinoid(s) (e.g., Thorium), a metalloid(s) (e.g., Silicon such as silicon monoxide or dioxide, Boron, etc.), an oxide precursor(s), a carbon source(s), a carbon precursor(s), and/or one or more nitrogen sources and/or nitrogen precursors.

EMBODIMENT 7

The method of producing high temperature ceramic powders of any of embodiments 1 to 6, characterized in that the gas is an inert gas including one or more of argon and nitrogen.

EMBODIMENT 8

The method of producing high temperature ceramic powders of any of embodiments 1 to 7, characterized in that the carbon source or carbon precursor includes one or more of a phenolic resin, a vinylidene chloride polymer, carbon black, acetylene carbon black, a hydrocarbon, and a carbohydrate.

EMBODIMENT 9

The method of producing high temperature ceramic powders of any of embodiments 1 to 8, characterized in that the solvent includes one or more of an alcohol, ethanol, 1-pentanol, or another hydrocarbon solvent.

EMBODIMENT 10

The method of producing high temperature ceramic powders of any of embodiments 1 to 9, characterized in that the gas is fed directly to the nebulizer or atomizer.

EMBODIMENT 11

The method of producing high temperature ceramic powders of any of embodiments 1 to 10, further comprising rinsing (or mixing and filtering) the product particles (e.g., with a solvent such as deionized water) to remove unwanted compositions (such as those other than HTCs, e.g., NaCl).

EMBODIMENT 12

The method of producing high temperature ceramic powders of any of embodiments 1 to 11, further comprising mechanically separating the product particles (e.g., using a centrifugal air separator, filters, screens, or vibration) to remove unwanted compositions or to sort the product particles by size or composition (such as those other than HTCs, e.g., NaCl).

EMBODIMENT 13

The method of producing high temperature ceramic powders of any of embodiments 1 to 12, characterized in that the transition metals or transition metal salts include one or more of Tantalum, Hafnium, Zirconium, Titanium, Niobium, Vanadium, Magnesium, Aluminum, Chromium, Molybdenum, Tungsten, Scandium, Yttrium, Lanthanum, and other Lanthanide metals, Manganese, Iron, Cobalt, and Nickel.

EMBODIMENT 14

The method of producing high temperature ceramic powders of any of embodiments 1 to 13, characterized in that the one or more metal compounds, metalloid compounds, transition metals, transition metal salts, actinoids, and metalloids are supplied in excess (e.g., with a molar carbon ratio ranging from 1 to 30).

EMBODIMENT 15

The method of producing high temperature ceramic powders of any of embodiments 1 to 14, characterized in that the high temperature ceramic particles have an average size ranging from 10 nm to 500 nm.

EMBODIMENT 16

The method of producing high temperature ceramic powders of any of embodiments 1 to 15, characterized in that the furnace is a single tubed furnace (which can have curves or bends).

EMBODIMENT 17

The method of producing high temperature ceramic powders of any of embodiments 1 to 16, characterized in that the furnace includes multiple individual tubes or a large heating chamber (for scaling up while maintaining effective heat transfer).

EMBODIMENT 18

The method of producing high temperature ceramic powders of any of embodiments 1 to 17, characterized in that gas exiting the furnace passes through a heat exchanger and gives heat to the gas before it enters the furnace (either before or after the solution is atomized in the incoming gas).

EMBODIMENT 19

The method of producing high temperature ceramic powders of any of embodiments 1 to 18, characterized in that the solution is mixed with a precipitating agent prior to being atomized to remove unwanted substances (e.g., adding ammonia to precipitate and then remove Chloride ions).

EMBODIMENT 20

The method of producing high temperature ceramic powders of any of embodiments 1 to 19, further comprising milling (e.g., focus ion beam (FIB) milling or ball milling) the product particles (or one or more types of the product particles, before or after mechanical separation, filtering, or rinsing).

EMBODIMENT 21

The method of producing high temperature ceramic powders of any of embodiments 1 to 20, characterized in that ambient air is excluded from the gas entering the furnace.

EMBODIMENT 22

The method of producing high temperature ceramic powders of any of embodiments 1 to 21, characterized in that the furnace is maintained at a temperature range of 1400° C. to 2400° C.

EMBODIMENT 23

The method of producing high temperature ceramic powders of any of embodiments 1 to 22, characterized in that the average furnace retention time (furnace volume/gas volumetric flow rate) is from 1 second to 30 minutes.

EMBODIMENT 24

The method of producing high temperature ceramic powders of any of embodiments 1 to 23, characterized in that the product particles include one or more of carbides, borides, or nitrides of Tantalum, Hafnium, Zirconium, Titanium, Niobium, Vanadium, Magnesium, Aluminum, Chromium, Molybenum, Tungsten, Scandium, Yttrium, Lanthanum, and other Lanthanide metals, Manganese, Iron, Cobalt, Nickel including their composites or solid solutions such as SiC, HfC, $HfB_2$, HfN, WC, TiC, $TiB_2$, TiN, BN, TaC, and $ZrB_2$, ZrC, ZrN, (Ta, Hf)C, and $(Zr, Hf)B_2$.

EMBODIMENT 25

The method of producing high temperature ceramic powders of any of embodiments 1 to 24, wherein the solution includes a nitrogen source (e.g., urea, glycine, and/or other nitrogen containing compounds).

REFERENCES

1. M. M. Opeka, I. G. Talmy and J. A. Zaykoski, 'Oxidation-based materials selection for 2000° C.+hypersonic aerosurfaces: Theoretical considerations and historical experience,' *J. Mater. Sci.,* 39 [19] 5887-5904 (2004).
2. E. Wuchina, E. Opila, M. Opeka, W. Fahrenholtz and I. Talmy, 'UHTCs: Ultra-High Temperature Ceramic Materials for Extreme Environment Applications,' *Electrochem Soc Interface,* 16 [4] 30 (2007).
3. J. A. Wollmershauser, B. N. Feigelson, E. P. Gorzkowski, C. T. Ellis, R. Goswami, S. B. Qadri, J. G. Tischler, F. J. Kub and R. K. Everett, 'An extended hardness limit in bulk nanoceramics,' *Acta Materialia,* 69 [0] 9-16 (2014).
4. Y. Tian, B. Xu, D. Yu, Y. Ma, Y. Wang, Y. Jiang, W. Hu, C. Tang, Y. Gao, K. Luo, Z. Zhao, L. Wang, B. Wen, J. He and Z. Liu, 'Ultrahard nanotwinned cubic boron nitride,' *Nature,* 493 [7432] 385-388 (2013).
5. T. Ishigaki, S. Oh, J. Li and D. Park, 'Controlling the synthesis of TaC nanopowders by injecting liquid precursor into RF induction plasma,' *Science and Technology of Advanced Materials,* 6 [2] 111-118 (2005).
6. D. Kwon, S. Hong and B. Kim, 'Fabrication of ultrafine TaC powders by mechano-chemical process,' *Mater Lett,* 58 [30] 3863-3867 (2004).
7. M. Sacks, C. Wang, Z. Yang and A. Jain, 'Carbothermal reduction synthesis of nanocrystalline zirconium carbide and hafnium carbide powders using solution-derived precursors,' *J. Mater. Sci.,* 39 [19] 6057-6066 (2004).
8. G. L. Messing, S. Zhang and G. V. Jayanthi, 'Ceramic Powder Synthesis by Spray Pyrolysis,' *J Am Ceram Soc,* 76 [11] 2707-2726 (1993).
9. D. S. Jung, S. B. Park and Y. C. Kang, 'Design of particles by spray pyrolysis and recent progress in its application,' *Korean Journal of Chemical Engineering,* 27 [6] 1621-1645 (2010).
10. W. Y. Teoh, R. Amal and L. Madler, 'Flame spray pyrolysis: An enabling technology for nanoparticles design and fabrication,' *Nanoscale,* 2 [8] 1324-1347 (2010).

11. T. LIU, O. SAKURAI, N. KIEDA, M. KATO and N. MIZUTANI, 'Preparation of Spherical $Si_3N_4$ Particles from Polysilazane by Ultrasonic Spray Pyrolysis Technique,' *Journal of the Ceramic Society of Japan*, 97 [1130] 1321-1325 (1989).
12. D. A. Lindquist, T. T. Kodas, D. M. Smith, X. Xiu, S. L. Hietala and R. T. Paine, 'Boron Nitride Powders Formed by Aerosol Decomposition of Poly(borazinylamine) Solutions,' *J Am Ceram Soc*, 74 [12] 3126-3128 (1991).
13. V. Salles and S. Bernard, 'A Review on the Preparation of Borazine-derived Boron Nitride Nanoparticles and Nanopolyhedrons by Spray-pyrolysis and Annealing Process,' *Nanomaterials and Nanotechnology*, 6 [1] doi: 10.5772/62161 (2016).
14. G. L. Wood, J. F. Janik, E. A. Pruss, D. Dreissig, W. J. Kroenke, T. Habereder, H. Noth and R. T. Paine, 'Aerosol Synthesis of Spherical Morphology Boron Nitride Powders from Organoborate Precursors,' *Chem. Mater.*, 18 [6] 1434-1442 (2006).
15. L. S. Cerovic, S. K. Milonjic, L. V. Zivkovic and D. P. Uskokovic, 'Synthesis of Spherical ?-Silicon Carbide Particles by Ultrasonic Spray Pyrolysis,' *J Am Ceram Soc*, 79 [8] 2215-2217 (1996).
16. J. Ko, J. Yoo, Y. Kim, S. J. Chung and S. I. Yoo, 'Synthesis and characterization of spherical magnesium di-boride nano-powders obtained by spray pyrolysis,' *Physica C: Superconductivity*, 412-414, Part 2 1194-1197 (2004).
17. A. I. Gusev, A. S. Kurlov and V. N. Lipatnikov, 'Atomic and vacancy ordering in carbide $\zeta$-Ta4C3-x ($0.28 \leq x \leq 0.40$) and phase equilibria in the Ta—C system,' *Journal of Solid State Chemistry*, 180 [11] 3234-3246 (2007).
18. Z. Cheng, 'Reaction Kinetics and Structural Evolution for the Formation of Nanocrystalline Silicon Carbide via Carbothermal Reduction,' *MS Thesis, Georgia Institute of Technology* (2004).

We claim:

1. A method of producing ceramic powders comprising:
   preparing a solution including a solvent and solutes;
   atomizing the solution;
   providing a gas and carrying the atomized solution into a furnace via the gas;
   evaporating the solvent, precipitating and drying the solutes, and performing a carbothermal reduction reaction in situ; and
   collecting product particles after exiting from the furnace.
2. The method of producing ceramic powders of claim 1, characterized in that the product particles include one or more of high temperature ceramics, non-oxide ceramics, and high temperature non-oxide ceramics.
3. The method of producing ceramic powders of claim 1, characterized in that the solution includes one or more of transition metals, actinoids, and metalloids.
4. The method of producing ceramic powders of claim 3, characterized in that the gas is an inert gas including one or more of argon and nitrogen.
5. The method of producing ceramic powders of claim 4, characterized in that the solution includes a carbon source or carbon precursor.
6. The method of producing ceramic powders of claim 5, characterized in that the carbon source or carbon precursor includes one or more of a phenolic resin, a vinylidene chloride polymer, carbon black, acetylene carbon black, a hydrocarbon, and a carbohydrate.
7. The method of producing ceramic powders of claim 5, characterized in that the solution is mixed with a precipitating agent prior to being atomized.
8. The method of producing ceramic powders of claim 5, characterized in that the solvent includes one or more alcohols.
9. The method of producing ceramic powders of claim 4, characterized in that the gas is fed directly to a nebulizer or atomizer and ambient air is kept out of the furnace.
10. A method of producing high temperature ceramic powders comprising:
    preparing a solution including a solvent and solutes;
    atomizing the solution;
    providing a gas and carrying the atomized solution into a furnace via the gas;
    evaporating the solvent, precipitating and drying the solutes, performing a thermolysis or pyrolysis reaction, and performing a carbothermal reduction reaction in situ; and
    collecting product particles after they exit from the furnace.
11. The method of producing ceramic powders of claim 10, characterized in that the solution includes one or more of metals, transition metals, actinoids, and metalloids, as well as a carbon source or carbon precursor.
12. The method of producing ceramic powders of claim 11, further comprising mixing a precipitating agent with the solution prior to it being atomized.
13. The method of producing ceramic powders of claim 11, further comprising rinsing or mixing and filtering the product particles with an additional solvent to remove unwanted compositions.
14. The method of producing ceramic powders of claim 10, characterized in that the solution includes one or more of Tantalum, Hafnium, Zirconium, Titanium, Niobium, Vanadium, Magnesium, Aluminum, Chromium, Molybenum, Tungsten, Scandium, Yttrium, Lanthanum, and other Lanthanide metals, Manganese, Iron, Cobalt, and Nickel.
15. The method of producing ceramic powders of claim 14, characterized in that the product particles include high temperature ceramic particles having an average size ranging from 10 nm to 500 nm.
16. The method of producing ceramic powders of claim 15, characterized in that a stage of the furnace is maintained at a temperature range of 1400° C. to 2400° C.
17. The method of producing high temperature ceramic powders of claim 16, characterized in that the average furnace retention time is less than 10 minutes.
18. The method of producing high temperature ceramic powders of claim 10, characterized in that the product particles include one or more of carbides, borides, or nitrides of Tantalum, Hafnium, Zirconium, Titanium, Niobium, Vanadium, Magnesium, Aluminum, Chromium, Molybenum, Tungsten, Scandium, Yttrium, Lanthanum, Lanthanide metals, Manganese, Iron, Cobalt, or Nickel.
19. The method of producing high temperature ceramic powders of claim 18, further comprising rinsing, or mixing and filtering, the product particles with an additional solvent.
20. The method, according to claim 18, wherein the product particles include one or more composites selected from SiC, HfC, $HfB_2$, HfN, WC, TiC, $TiB_2$, TiN, BN, TaC, $ZrB_2$, ZrC, ZrN, (Ta, Hf)C, and (Zr, Hf)$B_2$.

\* \* \* \* \*